METHOD OF TREATING HEMORRHOIDS

Jean Montandraud, Casablanca, Morocco, assignor to Societe d'Applications Chimiques d'Etudes et de Recherches, a joint stock company of Monaco
No Drawing. Filed Feb. 8, 1960, Ser. No. 7,077
1 Claim. (Cl. 167—58)

This invention relates to a new galenic form, namely a suppository, intended for the treatment of hemorrhoids, pruritis, and inflammations of the anal-rectal region and each suppository (unit does) containing a derivative of heparin of an amount corresponding to 5 to 200 mg. of heparin radical, as well as excipients (cocoa butter, wax, etc.). The invention also relates to a series of associations intended to improve and complete the action of the active heparin constituent.

The following properties of heparin salts are known:

(1) Anticoagulant
(2) Anti-exudative
(3) Anti-inflammatory
(4) Anti-hyperemic

The galenic suppository form according to the invention containing as its active constituent a derivative of heparin for the treatment of hemorrhoids, essentially enables a local action to be effected on the vascular membrane by external application using certain anti-inflammatory or congestion decreasing properties of heparin to the exclusion of the general anticoagulant properties which are cancelled under the conditions in which the use is made.

It has in fact been found that the general anticoagulant action of heparin does not manifest itself when these salts are administered in suppositories, whereas the anti-inflammatory action is maintained. In this manner any danger of hemorrhage is averted and the use of heparin as a local anti-inflammatory and decongestive agent may be envisaged without any counter indication.

(1) Commercial heparin which is the sodium salt of a complex organic acid present in the tissues of mammals and having the characteristic property of prolonging the clotting time of extravasated blood (British Pharmacopoeia, 1948). Heparin is a dextrorotatory polysaccharide constituted by groups of hexosamine and hexuronic acid containing ester functions of sulphuric acid. It has the properties of a polymer which, in the form of heparinic acid, has been given the empiric formula:

$$[C_{24}H_{38}O_{35}N_2S_5]_x$$

However, heparin is generally understood to be sodium heparinate or heparin sodium. The structural formula for this sodium salt is

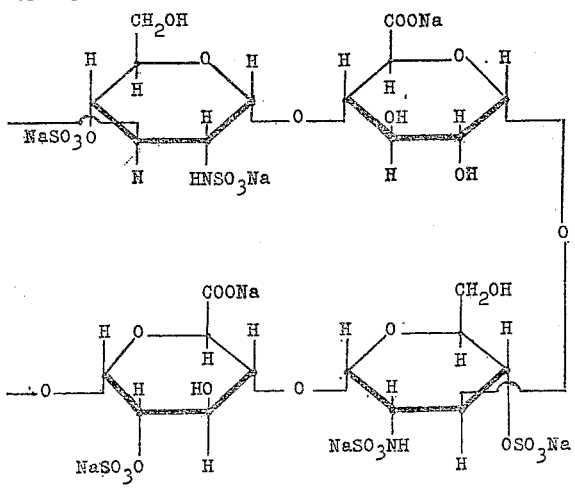

which corresponds to the empiric formula:

$$[C_{24}H_{31}O_{35}N_2S_5Na_7]_x$$

Heparin is standarised on the minimum basis of 100 units of anticoagulant activity per milligram of dry product, by the method of coagulation of sheep's plasma of Kuizenga, Nelson and Cartlaud, Am. J. Physiol. 139, 612, 1943.

(2) Choline heparinate: The preparation of this salt is effected by salification of the acid form of heparin by base choline in the proportion of 0.47 base choline for 0.59 heparinic acid. It is a white powder soluble in water and alcohol at 95° and in acetone as well as in the usual organic solvents.

Its analytical composition is:

|  | Percent |
|---|---|
| Carbon | 39.1 |
| Hydrogen | 7.2 |
| Nitrogen | 7 |
| Sulphur | 8.9 |

Its empirical formula is:

$$[(C_{24}H_{31}O_{35}N_2S_5)(C_5H_{14}ON)_7]X$$

having a molecular weight of (1764.4)X.

(3) Procaine heparinate: Prepared in the same way as choline heparinate by reaction between base procaine (2-diethyl amino ethyl ester of p-aminobenzoic acid) and heparinic acid in the proportion of 39.4% heparinic acid and 60.6% procaine.

Its molecular weight is (2726)X and its empirical formula is:

$$[(C_{24}H_{31}O_{35}N_2S_5)(C_{13}H_{20}O_2N_2)_7]X$$

It is a yellowish white powder soluble in water, in alcohol at 60° and in diluted acetone, insoluble in alcohol at 95° and the usual organic solvents.

Its aqueous solution shows two maxima on a spectrophotometer; namely a main maxima at 290 m$\mu$ and the other at 220 m$\mu$.

This absorption spectrum, due to the presence of procaine, enables the amount of this salt to be determined. This salt is very stable and is a well define organic combination of heparin.

These non-limiting examples are given in order to show that all the mineral or organic salts of heparin and in general any combination capable of allowing the action of the heparin radical to take place may be used in the galenic suppository form in the proportion of their heparin radical contents for the indicated therapeutic use.

Embodiments of suppositories according to the invention will now be given:

*Example I*

| Heparin (sodium salt) | mg | 25 |
|---|---|---|

Cocoa butter, q.s.p. 2 g.

The preparation may be effected in the cold, care being taken to ensure a good distribution of the active ingredient, or with the use of heat, by dispersion in cocoa butter at its melting temperature.

*Example II*

| Heparin | mg | 25 |
|---|---|---|
| Wax |  | 0.50 |
| Cocoa butter |  | 2.50 |

In this formula wax is added to the cocoa butter in order to increase its melting point.

*Example III*

| Sodium heparinate |  | 0.010 |
|---|---|---|
| Glyceric esters of saturated fatty acids, French Pharmacopoeia 32 and 42° | g | 2 |

In the molten state, the esters form emulsions with water or mucosities and thus ensure a better liberation and a better diffusion of heparin derivatives on contact with the mucous membrane.

The manufacture of these suppositories is in every respect similar to that of cocoa butter suppositories.

The incorporation of the heparin derivative is effected in the melted polyester mass between 40 and 35° C., by constantly stirring until the temperature is lowered to approximately 33° which is favourable for the pouring operation.

*Example IV*

In this example there is used as an excipient a polymer of ethylene oxide fixed on a sulfamido-aromatic radical, PM approximately 5000 having a melting point 48–52°, which is melted in a water bath at 70° and to which is added the heparin derivative dissolved in a small amount of water, and with the possible addition of glycerin. After homogenisation, the product is allowed to cool to 60° and is cast in moulds.

Hereafter are given two formulae comprising this excipient.

Formula A:

| | G. |
|---|---|
| Choline heparinate | 0.020 |
| Excipient | 1.58 |
| Distilled water | 0.20 |
| Glycerin | 0.20 |
| Stearic acid | 0.02 |

Formula B:

| | |
|---|---|
| Procaine heparinate | 0.050 |
| Excipient | 1.80 |
| Distilled water | 0.10 |
| Propylene glycol 1-2 | 0.10 |

Although in the preceding examples sodium heparinate, procaine heparinate and choline heparinate have been mentioned as the active component within the suppository composition according to the invention, it will of course be understood that in a general manner all mineral or organic salts of heparin may be used in this form of suppository in proportion of their heparinic radical contents for the therapeutic use indicated. This proportion may advantageously be of the order of 10–15 mg. per suppository.

The treatment of an attack of hemorrhoids comprises the use of from 4 to 6 of these suppositories during the first day and of a smaller number of suppositories during each of the following days.

In general an improvement of the painful and inflammatory condition is obtained in the very first hours and is maintained for several weeks after treatment has ceased.

This treatment by heparin suppositories, which is more pathogenic than symptomatic is in every respect different from the use of conventional calming suppositories containing a local anesthetic of vitamins P or vasoconstrictors.

What I claim is:

A method of treating hemorrhoids to reduce inflammation and congestion thereof while avoiding local hemorrhage which comprises applying to the hemorrhoids an effective amount of a heparin-releasing compound, selected from the group consisting of choline heparinate, procaine heparinate and sodium heparinate, which has been mixed with water and shaped in suppository form with a suppository base material, whereby said base material melts and said heparin-releasing compound comes into intimate contact with the hemorrhoids in the form of dissociated free heparin which exerts an ameliorative action without reducing the clotting time of blood engorged in the hemorrhoids.

References Cited in the file of this patent

UNITED STATES PATENTS

| 2,055,063 | Bird | Sept. 22, 1936 |
| 2,538,127 | Saunders et al. | Jan. 16, 1951 |
| 2,778,769 | Fahrenback et al. | Jan. 22, 1957 |
| 2,830,932 | Cushing et al. | Apr. 15, 1958 |

OTHER REFERENCES

Loomis et al.: J. Pharmacol. and Exptl. Theraps. 104:1, January 1952, pp. 87–92.

Ghanem: The Lancet, II, 7052, October 1958, p. 907.